Figure 4:
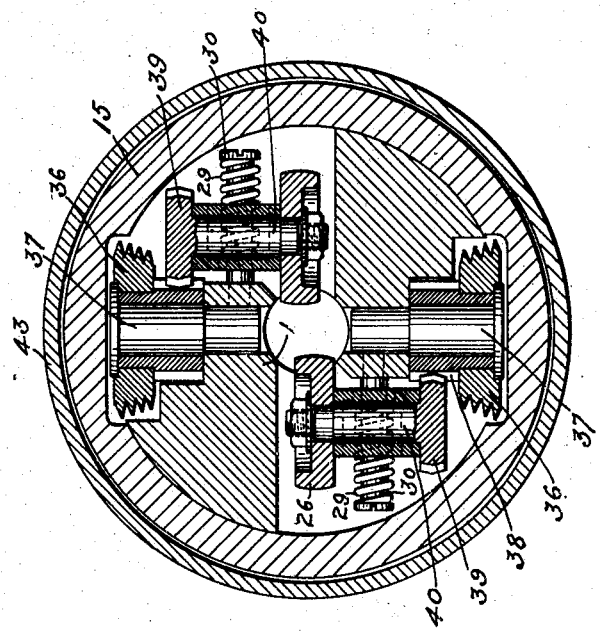

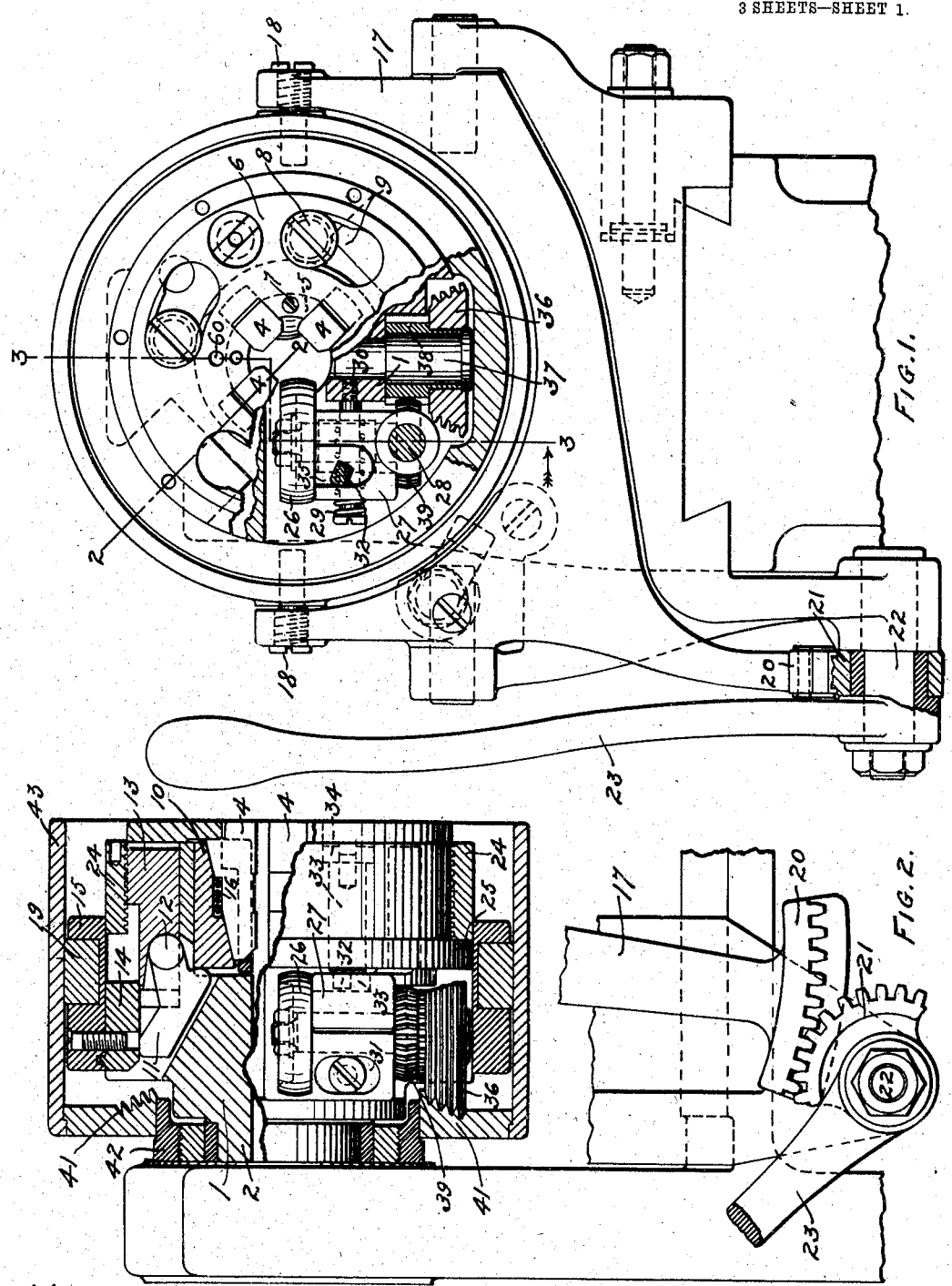

No. 791,543. PATENTED JUNE 6, 1905.
W. S. DAVENPORT.
CHUCK AND FEED MECHANISM.
APPLICATION FILED NOV. 4, 1901.

3 SHEETS—SHEET 2.

WITNESSES, INVENTOR,
James H. Thurston William S. Davenport,
Catherine G. Bradley. BY Wilmarth H. Thurston
ATT'Y.

No. 791,543. PATENTED JUNE 6, 1905.
W. S. DAVENPORT.
CHUCK AND FEED MECHANISM.
APPLICATION FILED NOV. 4, 1901.
3 SHEETS—SHEET 3.
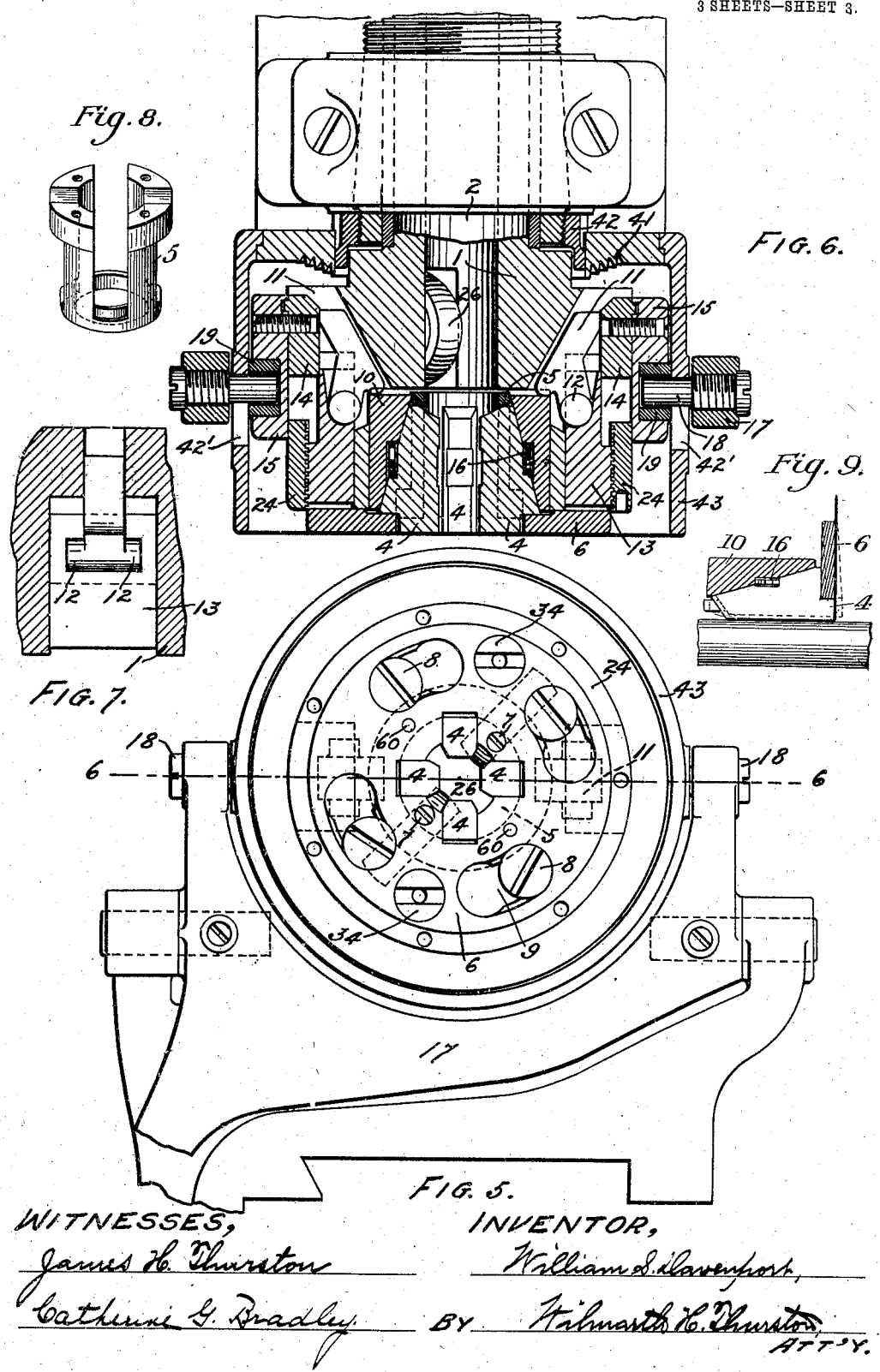
WITNESSES, INVENTOR,
James H. Thurston William S. Davenport,
Catherine G. Bradley BY Wilmarth H. Thurston
ATT'Y.

No. 791,543. Patented June 6, 1905.

UNITED STATES PATENT OFFICE.

WILLIAM S. DAVENPORT, OF NEW BEDFORD, MASSACHUSETTS, ASSIGNOR TO BROWN AND SHARPE MANUFACTURING COMPANY, OF PROVIDENCE, RHODE ISLAND, A CORPORATION OF RHODE ISLAND.

CHUCK AND FEED MECHANISM.

SPECIFICATION forming part of Letters Patent No. 791,543, dated June 6, 1905.

Application filed November 4, 1901. Serial No. 81,112.

*To all whom it may concern:*

Be it known that I, WILLIAM S. DAVENPORT, formerly of the city and county of Providence, in the State of Rhode Island, but now residing at New Bedford, in the county of Bristol and State of Massachusetts, have invented certain new and useful Improvements in Chucks and Feed Mechanisms; and I do hereby declare the following specification, taken in connection with the accompanying drawings, forming a part of the same, to be a full, clear, and exact description thereof.

The invention relates to that class of machines in which a rod of stock is held in the jaws of a rotary chuck and is intermittently fed forward through said chuck by feeding devices; and it relates more especially to a chuck suitable for use in such machines and to a combined chuck and feed mechanism in which the feeding devices are supported and carried by the chuck-body.

The object of the invention is to provide a simple and efficient construction of chuck and one in which the jaws of the chuck may be readily removed and replaced to adapt the chuck to different sizes and shapes of rods and to replace broken or worn jaws.

A further object is to provide a simple, efficient, and compact mechanism for holding and rotating the rod of stock during the action upon it of the mechanisms of the machine in which the invention is employed and for intermittently feeding forward the rod of stock and a mechanism by which all or nearly all of a rod of stock may be efficiently delivered to the holding devices.

The first of these objects is accomplished by the construction and arrangement of parts hereinafter described and by mounting the chuck-jaws in a removable carrier or cage which may be readily removed from or inserted into position in the chuck. The second object is accomplished by mounting the feeding devices in the chuck-body and arranging them adjacent to the jaws of the chuck.

The features of the invention will be better understood from a description of the mechanism shown in the drawings, which embodies all the features of the invention in their preferred forms, and in which—

Figure 3:
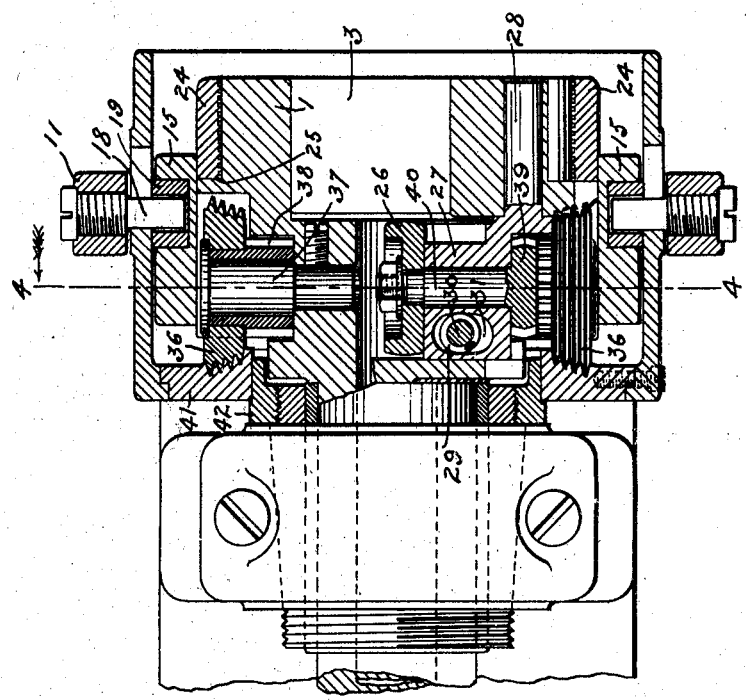

Figure 1 is a front elevation, partly in section, of the combined chuck and feeding mechanism. Fig. 2 is a sectional elevation, the upper part being on the line 2 2, Fig. 1, and the lower part showing the chuck-body and feeding devices in elevation. Fig. 3 is a sectional view on lines 3 3, Fig. 1, with the chuck turned through an angle of ninety degrees. Fig. 4 is a sectional view on line 4 4, Fig. 3. Fig. 5 is an end elevation with the revolving parts turned at an angle of forty-five degrees from the position shown in Fig. 1. Fig. 6 is a sectional view on line 6 6, Fig. 5. Fig. 7 is a detail showing the inner side of the fulcrum-block and jaw-operating lever. Fig. 8 is a detail view of the removable cage, and Fig. 9 is a detail indicating the elasticity of the front plate.

In the construction shown the chuck-body 1, which supports and carries the parts of the chuck, is formed on the end of the spindle 2, which carries said chuck, so that the chuck-body is secured to the spindle by being formed integral therewith, although it will be understood that the chuck-body may be separable from the spindle, if desired, and may be secured thereto in other ways, as by a screw-thread on the end of the spindle, as is usual in those machines wherein it is desirable to have the chuck so connected with the spindle that it may be removed therefrom. The chuck-body is provided with a circular recess or chamber 3, Fig. 3, in its forward end, within which the jaws for clamping the rod of stock and the devices for operating said jaws are located. The jaws 4, of which there are four in the chuck shown, are supported in slots formed in a cylindrical cage or carrier 5, Fig. 8, which projects inward from a plate 6, to which it is secured by screws 7, Figs. 1 and 5. The front plate 6 of the jaw-carrying cage is secured to the front face of the chuck-body by screws 8, which pass through slots 9 in the plate, the heads of the screws engaging ribs on the sides of the slots, which ribs are cut away at one end of the slots to allow the removal of the plate without removing the screws. This plate is preferably made of the proper thickness to resist the heavy pressure put upon it by the jaws when forced against the stock and yet to have sufficient elasticity to allow the jaws to accommodate themselves to variations in the diameter of rough stock, as indicated in Fig. 9. The jaws 4 are beveled at the rear ends to rest upon the rear beveled ends of the slots in the cage, and they engage the front plate 6 at or near their front ends, the jaws thus being prevented from dropping inward through the slots and yet being readily removed from the slots when the cage is disconnected from the chuck-body.

When it is desired to remove the jaw-carrying cage, the plate 6 is turned by means of a pin-wrench engaged in holes 60 until the openings at the end of the slots 9 register with the heads of the screws 8, when the plate, with its attached cylindrical part, may be removed. The jaws may then be readily changed for a different-sized stock and the cage replaced in the chuck-body, or a different cage carrying a different number of jaws may be secured in place in the chuck-body.

The jaws are forced inward to clamp the stock by the action of a sleeve 10, fitted within the chamber 3 and having a conical inner surface which engages the inclined or conical outer edges of the jaws. When this sleeve is moved forward, the jaws are thus forced inward to clamp the stock, and when the sleeve is moved rearward the pressure upon the jaws, and consequently their grip upon the stock, is relieved. The sleeve is forced forward by the action of levers 11, arranged to bear upon the inner ends of the sleeves 10 and having fulcrum-trunnions 12, supported in blocks 13, arranged in slots formed in the body 1, there being two fulcrum-blocks 13 and two levers arranged on opposite sides of the chuck-body. The levers are located in slots in the chuck-body, and their outer ends are arranged to be engaged by cam shoes or slides 14, mounted in grooves formed in the outer surface of the chuck-body and connected with a reciprocating slide in the form of a sleeve 15, which surrounds said body. When the chuck-jaws are to be closed or forced inward against the stock, the sleeve 15 is moved rearward, so that the shoes 14 ride over the outer ends of the levers 11, forcing said levers inward, which inward movement forces the sleeve 10 forward and forces the jaws 4 firmly against the stock. When the sleeve 15 is moved forward, the levers 11 are released, thus releasing the sleeve 10 and allowing said sleeve to be moved back by a spring 16, interposed between said sleeve and the jaws 4, thus allowing the jaws to open freely while the stock is being fed.

The sleeve 15 may be operated either automatically or manually at the proper times to open and close the chuck-jaws by any suitable or well-known devices, such as are commonly used in machines in which chucks of the general class above described are commonly used. In the construction shown the chuck-operating sleeve is operated by a forked lever 17, pivoted to the frame and having its upper ends connected, by means of screw-pins 18, with a ring 19, which is mounted in an annular groove in the sleeve. The lower end of the lever 17 is provided with a gear-segment 20, engaged by a segment 21, mounted on a stud 22 and secured to a hand operating-lever 23.

In order to provide for the adjustment or variation in the pressure exerted upon the stock by the chuck-jaws, means are provided for varying the position of the fulcrums of the levers 11. In the construction shown the means for effecting this result consists of a ring 24, mounted upon the forward end of the chuck-body and provided with an internal screw-thread which engages screw-threads formed on the ends of the fulcrum-blocks 13. The adjusting-ring 24 engages a shoulder 25 upon the chuck-body, and by turning this ring the fulcrum-blocks may be moved forward or back to change the fulcrum-points of the levers 11, and thus get the proper amount of pressure upon the bar of stock in the jaws of the chuck.

The feeding devices for advancing the rod of stock through the jaws of the chuck are mounted in the chuck-body and are arranged adjacent to the jaws of the chuck, so that they act upon the stock just back of said jaws, and thus the stock will be under the control of said feeding devices until the rod of stock has been nearly exhausted. A further advantage of this arrangement of the feeding devices resides in the compactness of the feeding and clamping devices. In case the operation of the feeding devices is controlled by the mechanism for operating the chuck-jaws this arrangement also enables the employment of more simple and inexpensive connections between the said mechanism and the mechanism for controlling the feeding devices. Any suitable feeding devices which admit of the location and arrangement referred to may be employed, although it is preferred to employ feeding-rolls for feeding forward the stock and to operate and control said rolls by the devices shown. In the construction shown the feeding devices are in the form of rolls 26, which are mounted in recesses formed in the chuck-body and revolve with said body, the rolls also being given a rotary movement about their axes at suitable intervals to feed forward the rod of stock which passes between said rolls and is engaged by them. In order that the rolls may yield to accommodate variations in the size of the rod of stock, they are supported in carriers 27, which are mounted in the chuck-body by means of pivot-studs 28, which project from said carriers, the carriers being formed to fit between the radial walls of the recesses in which they are mounted. The rolls are held yieldingly against the rod of stock by the action of springs 29, which surround pins 30, projecting from the clutch-body through holes in the carriers 27, the springs being interposed between the heads of said pins and the bottom of a recess 31, formed in the carrier.

The feeding-rolls may be thrown outward or opened for the introduction of a new rod of stock in case the stock is of such size that the rolls offer too great a resistance to its introduction by cams or eccentric pins 32, formed on the ends of short shafts 33, mounted in the chuck-body and having slotted heads 34, by which they may be turned to open or release the rolls, the heads being located in recesses in the face of the chuck-body and accessible through holes in the front plate 6. The pins 32 project into recesses 35 in the carriers 27 and engage the outer side of said recesses when the shafts 33 are turned to open the rolls.

The rolls may be driven or rotated on their axes at the proper time to feed forward the stock by any suitable mechanism adapted to effect an intermittent rotation of said rolls. It is preferred, however, to drive the rolls through rotary members carried by the chuck-body and connected with the rolls, so that the rotation of the rotary members will be transmitted to the rolls, and it is also preferred to intermittently rotate the rotary members by engaging and disengaging said members with a non-rotary member about which the rotary members travel as they move with the chuck-body. In the construction shown the rotary members are in the form of friction disks or gears 36, mounted upon studs 37, secured in the chuck-body, and these disks are connected with the rolls through pinions 38, secured to the disks and engaging gears 39, formed on the ends of the shafts 40, to which the rolls are secured, the gears being formed so that they do not interfere with the rocking movement of the carriers. The stationary or non-rotary member with which the disks 36 coöperate is in the form of a friction disk or gear 41, which is movable into and out of engagement with the disks 36. The disk 41 is mounted to slide on the spindle-box nut 42 and is operated through the chuck-jaw-operating mechanism, the connections being such that the disk is engaged with the disks 36 when the chuck-jaws are opened and is disengaged therewith when the chuck-jaws are closed to grip the stock. In the construction shown the disk 41 is connected with each end of the lever through a slide, which is secured to the disk and is provided with elongated slots 42', through which the pins 18 pass. The slide is preferably made in the form of a casing 43, surrounding the chuck-body and protecting the feeding devices and the mechanism for operating the chuck-jaws, the casing being supported on the ring 19. In this construction when the lever is operated to open the chuck-jaws the pins 18 engage the front ends of the slots 42' and draw the disk 41 forward into engagement with the disks 36, and when the lever is operated to close the chuck-jaws upon the stock the pins engage the rear ends of the slots and move the disk 41 out of engagement with the disks 36.

The above-described construction provides a simple and efficient form of combined chuck and feed in which the feeding devices are arranged in close proximity to the chuck-jaws and in which the operating devices are simple, effective, and compactly arranged. This combined chuck and feed may be embodied in various machines in which a rod of stock is held in the jaws of a chuck and is intermittently fed through said jaws, or it may be constructed as a separate attachment to be secured to the spindle of a machine or removed, as described.

What I claim as my invention, and desire to secure by Letters Patent, is—

1. In a chuck, the combination, with the chuck-body, of a cylindrical cage provided with slots, and chuck-jaws loosely supported in said slots.

2. In a chuck, the combination, with the chuck-body, of a cage removably secured thereto, chuck-jaws having inclined outer edges carried by said cage, a sleeve mounted in said chuck-body and having an inner conical surface engaging said jaws, and means for operating said sleeve.

3. In a chuck, the combination, with the chuck-body, of a cage removably secured thereto, chuck-jaws having inclined outer edges carried by said cage, a sleeve mounted in said chuck-body and having an inner conical surface engaging said jaws, levers for forcing said sleeve forward, and sliding shoes for acting on said levers.

4. In a chuck, the combination, with the chuck-body, of jaws having inclined outer edges mounted therein, a sleeve mounted in said chuck-body and having an inner conical surface engaging said jaws, levers for forcing said sleeve forward, fulcrum-blocks for said levers arranged in the front end of said chuck-body, and an adjusting-ring for varying the position of said fulcrum-blocks.

5. In a chuck, the combination of a chuck-body having a chamber in its front end, chuck-jaws having inclined outer edges within said chamber, a sleeve within said chamber having a conical inner surface engaging said jaws, levers engaging said sleeve, fulcrum-blocks for said levers arranged in slots in the front end of said body, and an adjusting-ring for moving said blocks, mounted on the front end of said body.

6. In a chuck, the combination with the chuck-body, of a cage comprising a cylindrical slotted part and a front plate, chuck-jaws carried in said slots, and means for removably securing the front plate to the face of the chuck-body.

7. In a chuck, the combination with the chuck-body, of jaws mounted therein, means for operating the jaws to clamp the stock, and a plate engaged by said jaws and having sufficient elasticity to enable the jaws to accommodate themselves to variations in the size of the stock.

8. The combination with a chuck-body, of chuck-jaws mounted therein, means for operating said jaws, feeding devices carried by said chuck-body and means for intermittently operating said feeding devices to advance a rod of stock.

9. The combination with a chuck-body, of chuck-jaws mounted therein, means for operating said jaws, feeding-rolls carried by said chuck-body, and means for intermittently rotating said rolls.

10. The combination with a chuck-body, of chuck-jaws mounted therein, means for operating said jaws, feeding-rolls mounted in said chuck-body adjacent to said jaws and means for intermittently rotating said rolls.

11. The combination with a chuck-body, of chuck-jaws mounted therein, means for operating said jaws, feed-rolls mounted in said body, rotary members mounted in said body and connected with said rolls, a non-rotary member, and means for intermittently engaging said rotary and non-rotary members.

12. The combination with a chuck-body, of chuck-jaws mounted therein, a sliding sleeve mounted on said chuck-body and connections between said sleeve and jaws, feed-rolls mounted in said body, rotary members connected with said rolls, a non-rotary member connected with said sleeve.

13. The combination with a chuck-body, of chuck-jaws mounted therein, means for operating said jaws, feed-rolls mounted in said body, rotary members connected with said rolls, a non-rotary member, a casing surrounding said body and secured to said non-rotary member, and means for connecting said casing with the jaw-operating means.

14. The combination of a chuck provided with jaws, means for operating said jaws including a reciprocating slide, feeding devices, means for throwing said feeding devices into and out of action including a slide adjacent to said reciprocating slide, and a pin connecting said slides.

15. The combination of a chuck provided with jaws, means for operating said jaws including a slide, feeding devices, means for throwing said devices into and out of action including a slide, a slot in said latter slide, and an operating-pin extending through said slot and connected with said former slide.

WILLIAM S. DAVENPORT.

Witnesses:
 FRANK W. CRAIG,
 CHARLES MITCHELL.